United States Patent
Onishi et al.

(10) Patent No.: US 12,351,697 B2
(45) Date of Patent: Jul. 8, 2025

(54) RESIN COMPOSITION FOR INFRARED RAY-BLOCKING TRANSPARENT MEMBER, AND MOLDED ARTICLE

(71) Applicant: TEIJIN LIMITED, Osaka (JP)

(72) Inventors: Yosuke Onishi, Osaka (JP); Akika Ito, Osaka (JP)

(73) Assignee: TEIJIN LIMITED, Osaka (JP)

( * ) Notice: Subject to any disclaimer, the term of this patent is extended or adjusted under 35 U.S.C. 154(b) by 930 days.

(21) Appl. No.: 17/438,273

(22) PCT Filed: Feb. 28, 2020

(86) PCT No.: PCT/JP2020/008316
§ 371 (c)(1),
(2) Date: Sep. 10, 2021

(87) PCT Pub. No.: WO2020/184222
PCT Pub. Date: Sep. 17, 2020

(65) Prior Publication Data
US 2022/0145041 A1     May 12, 2022

(30) Foreign Application Priority Data
Mar. 13, 2019    (JP) ................................. 2019-046018

(51) Int. Cl.
| | | |
|---|---|---|
| *C08K 3/22* | (2006.01) | |
| *C08J 5/18* | (2006.01) | |
| *C08J 7/046* | (2020.01) | |
| *C08K 5/103* | (2006.01) | |
| *C08K 5/3475* | (2006.01) | |
| *C08K 5/3492* | (2006.01) | |
| *C08K 5/357* | (2006.01) | |

(52) U.S. Cl.
CPC .................. *C08K 3/22* (2013.01); *C08J 5/18* (2013.01); *C08J 7/046* (2020.01); *C08K 5/103* (2013.01); *C08K 5/3475* (2013.01); *C08K 5/3492* (2013.01); *C08K 5/357* (2013.01); *C08J 2369/00* (2013.01); *C08K 2003/2258* (2013.01); *C08K 2201/003* (2013.01)

(58) Field of Classification Search
CPC .................. C08K 2003/2258; C08L 69/00
See application file for complete search history.

(56) References Cited

U.S. PATENT DOCUMENTS

| | | | | |
|---|---|---|---|---|
| 8,268,460 B2 * | 9/2012 | Fujita | ...................... | C08J 3/226 |
| | | | | 523/135 |
| 8,697,788 B2 * | 4/2014 | Tanabe | ...................... | C08K 5/51 |
| | | | | 524/126 |
| 2012/0095141 A1 | 4/2012 | Tanabe et al. | | |
| 2018/0201782 A1 | 7/2018 | Egawa | | |
| 2021/0253848 A1 * | 8/2021 | Nabeshima | .............. | B60Q 1/04 |

FOREIGN PATENT DOCUMENTS

| | | | |
|---|---|---|---|
| JP | 11-335548 | | 12/1999 |
| JP | 2003113294 A | * | 4/2003 |
| JP | 2003-531926 | | 10/2003 |
| JP | 2006-282736 | | 10/2006 |
| JP | 2008-156386 | | 7/2008 |
| JP | 5714826 | | 5/2015 |
| JP | 2016-169189 | | 9/2016 |
| JP | 2017-95686 | | 6/2017 |
| JP | 2017-179053 | | 10/2017 |
| JP | 2021169543 A | * | 10/2021 |
| WO | 2010/137729 | | 12/2010 |
| WO | 2010/143732 | | 12/2010 |
| WO | 2017130492 | | 8/2017 |
| WO | 2019/026784 | | 2/2019 |

OTHER PUBLICATIONS

Machine translation of JP-2003113294-A (2003, 9 pages).*
Machine translation of JP 2017-095686 (2017, 9 pages).*
Piracha (The thermal degradation of glycidyl methacrylate-methyl methacrylate copolymers, Polymer Degradation and Stability, 51, 1996, pp. 27-34).*
Zulfiqar (Thermal degradation of glycidyl methacrylate-styrene copolymers, Polymer Degradation and Stability, 43, 1994, pp. 403-408).*
Machine translation of JP 2021-169543 (2021, 6 pages).*
International Search Report issued May 19, 2020 in International (PCT) Application No. PCT/JP2020/008316.

* cited by examiner

*Primary Examiner* — Brieann R Johnston
(74) *Attorney, Agent, or Firm* — Wenderoth, Lind & Ponack, L.L.P.

(57) ABSTRACT

The present invention provides a resin composition which has an infrared ray-blocking ability with excellent moist heat resistance while maintaining high transparency. The resin composition of the present invention contains, relative to (A) 100 parts by weight of a polycarbonate resin (component A), (B) 0.0001 to 0.2 part by weight of composite tungsten oxide fine particles (component B) represented by the general formula: $M_xW_yO_z$, (C) 0.0001 to 0.1 part by weight of an epoxy resin (component C), and (D) 0.001 to 0.5 part by weight of a release agent (component D).

11 Claims, No Drawings

RESIN COMPOSITION FOR INFRARED RAY-BLOCKING TRANSPARENT MEMBER, AND MOLDED ARTICLE

TECHNICAL FIELD

The present invention relates to a polycarbonate resin composition containing composite tungsten oxide fine particles as an inorganic material having an infrared ray absorbing ability and a molded article comprising the polycarbonate resin composition.

BACKGROUND ART

A transparent material having an infrared ray-blocking ability has an effect to suppress an increase of the temperature in a room and an increase of the human effective temperature, and is expected to be effective in reducing the burden on the environment when used in window members in the automobile application, building material application, and the like. Particularly, when imparting the infrared ray-blocking ability to a transparent resin, the effect on a reduction of the burden on the environment, such as suppression of $CO_2$ emissions, is remarkable from the viewpoint of the reduction of weight and thermal management. As a method for imparting the infrared ray-blocking ability, PTL 1 discloses a technique of adding composite tungsten oxide fine particles to a transparent resin, but there is a problem in that the infrared ray-blocking ability becomes poor under moist heat conditions with the passage of time. PTL2 discloses a technique in which the particle diameter of composite tungsten oxide fine particles is restricted to improve the resistance to moist heat (moist heat resistance), but the effect of the technique is unsatisfactory. Further, PTL 3 discloses a technique in which a fatty acid ester is incorporated into a resin to improve the thermal stability of the resin, but no effect is recognized in the improvement of the moist heat resistance for the infrared ray-blocking ability. Further, PTL 4 discloses a technique in which an epoxy resin is incorporated into a transparent resin to suppress hydrolysis of the resin, but no effect is recognized in the improvement of the moist heat resistance for the infrared ray-blocking ability. Therefore, an improvement of the transparent resin having added composite tungsten oxide fine particles in the moist heat resistance for the infrared ray-blocking ability is desired.

CITATION LIST

Patent Literature

PTL 1: Japanese Patent No. 5714826
PTL 2: JP-A-2017-95686
PTL 3: JP-A-2008-156386
PTL 4: JP-T-2003-531926 (the term "JP-T" as used herein means a published Japanese translation of a PCT patent application.)

SUMMARY OF INVENTION

Technical Problem

An object of the present invention is to obtain a resin composition which has an infrared ray-blocking ability with excellent moist heat resistance while maintaining high transparency, and a molded article thereof.

Solution to Problem

The present inventors have conducted extensive and intensive studies with a view toward solving the above-mentioned problems. As a result, it has been found that, by adding composite tungsten oxide fine particles, an epoxy resin, and a fatty acid ester to a polycarbonate resin, there can be obtained a polycarbonate resin composition which exhibits high infrared ray-blocking ability with excellent moist heat resistance and high transmission properties, and a molded article comprising the resin composition. Specifically, the above-mentioned object is attained by a resin composition containing, relative to (A) 100 parts by weight of a polycarbonate resin (component A), (B) 0.0001 to 0.2 part by weight of composite tungsten oxide fine particles (component B) represented by the general formula: $M_xW_yO_z$ (wherein M represents at least one element selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, TI, Si, Ge, Sn, Pb, Sb, B, F, P, S, Se, Br, Te, Ti, Nb, V, Mo, Ta, Re, Be, Hf, Os, Bi, and I, W represents tungsten, 0 represents oxygen, $0.001 \le x/y \le 1$, and $2.2 \le z/y \le 3.0$), (C) 0.0001 to 0.1 part by weight of an epoxy resin (component C), and (D) 0.001 to 0.5 part by weight of a release agent which is a fatty acid ester containing as a main component a full ester of a fatty acid and a polyhydric alcohol (component D).

Advantageous Effects of Invention

The resin composition of the present invention has an infrared ray-blocking ability with excellent moist heat resistance while maintaining high transparency, and therefore is advantageously used for a lighting member for a vehicle, a sensor cover for a vehicle, a display device cover for a vehicle, a window member for a vehicle, a display device cover for a relay, a window member for a building material, or the like, and the effect of the resin composition is of extremely great commercial significance.

DESCRIPTION OF EMBODIMENTS

Hereinbelow, the constituents in the present invention will be described in detail.

(Component A: Polycarbonate Resin)

The polycarbonate resin used as the component A in the invention is obtained by reacting a dihydric phenol and a carbonate precursor. Examples of methods for reaction include an interfacial polymerization method, a melt transesterification method, a solid phase transesterification method for a carbonate prepolymer, and a ring-opening polymerization method for a cyclic carbonate compound.

Representative examples of the dihydric phenol used in the invention include hydroquinone, resorcinol, 4,4'-biphenol, 1,1-bis(4-hydroxyphenyl)ethane, 2,2-bis(4-hydroxyphenyl)propane (which is generally called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl) oxide, bis(4-hydroxyphenyl) sulfide, bis(4-hydroxyphenyl) sulfoxide, bis(4-hydroxyphenyl)sulfone, bis(4-hydroxyphenyl) ketone, bis(4-hydroxyphenyl) ester, 2,2-bis(3,5-dibromo-4-hydroxyphenyl)propane, bis(3,5-dibromo-4-hydroxyphenyl) sulfone, bis(4-hydroxy-3-methylphenyl) sulfide, 9,9-bis(4-hydroxyphenyl)fluorene, and 9,9-bis(4-hydroxy-3-methylphenyl)fluorene. A preferred dihydric phenol is a bis(4-hydroxyphenyl)alkane, and especially, in view of the impact resistance, bisphenol A is particularly preferred.

As a carbonate precursor, a carbonyl halide, a carbonic diester, a haloformate, or the like is used, and specific examples include phosgene, diphenyl carbonate, and a dihaloformate of a dihydric phenol.

When the polycarbonate resin is produced from the above-mentioned dihydric phenol and carbonate precursor by an interfacial polymerization method, if necessary, a catalyst, a chain terminator, an antioxidant for preventing the dihydric phenol from being oxidized, or the like may be used. The polycarbonate resin in the invention includes a branched polycarbonate resin obtained by copolymerizing a trifunctional or multifunctional aromatic compound, a polyester carbonate resin obtained by copolymerizing an aromatic or aliphatic (including alicyclic) bifunctional carboxylic acid, a copolymerized polycarbonate resin obtained by copolymerizing a bifunctional alcohol (including alicyclic), and a polyester carbonate resin obtained by copolymerizing the above bifunctional carboxylic acid and bifunctional alcohol. The polycarbonate resin in the invention may be a mixture of two or more types of the obtained polycarbonate resins.

As a trifunctional or multifunctional aromatic compound, 1,1,1-tris(4-hydroxyphenyl)ethane, 1,1,1-tris(3,5-dimethyl-4-hydroxyphenyl)ethane, or the like can be used.

When a multifunctional compound capable of forming a branched polycarbonate is contained, the amount of such a compound in the total amount of the aromatic polycarbonate is 0.001 to 1 mol %, preferably 0.005 to 0.9 mol %, especially preferably 0.01 to 0.8 mol %. Particularly, in the case of a melt transesterification method, a side reaction may occur to cause a branched structure, and the amount of such a branched structure in the total amount of the aromatic polycarbonate is 0.001 to 1 mol %, preferably 0.005 to 0.9 mol %, especially preferably 0.01 to 0.8 mol %. The above amount can be determined by 1H-NMR measurement.

As an aliphatic bifunctional carboxylic acid, an $\alpha,\omega$-dicarboxylic acid is preferred. Preferred examples of aliphatic bifunctional carboxylic acids include linear saturated aliphatic dicarboxylic acids, such as sebacic acid (decanedioic acid), dodecanedioic acid, tetradecanedioic acid, octadecanedioic acid, and icosanedioic acid, and alicyclic dicarboxylic acids, such as cyclohexanedicarboxylic acid. As a bifunctional alcohol, an alicyclic diol is more preferred, and examples include cyclohexanedimethanol, cyclohexanediol, and tricyclodecanedimethanol.

A polycarbonate-polyorganosiloxane copolymer obtained by further copolymerizing a polyorganosiloxane unit can be used.

The reaction conducted by an interfacial polymerization method is generally a reaction of a dihydric phenol and phosgene, and the reaction is conducted in the presence of an acid binder and an organic solvent. As an acid binder, an alkali metal hydroxide, such as sodium hydroxide or potassium hydroxide, pyridine, or the like is used.

As an organic solvent, a hydrocarbon halide, such as methylene chloride or chlorobenzene, is used.

Further, for promoting the reaction, a catalyst, such as a tertiary amine or a quaternary ammonium salt, can be used, and, as a molecular weight modifier, monofunctional phenols, such as phenol, p-tert-butylphenol, or p-cumylphenol, are preferably used. Examples of monofunctional phenols include decylphenol, dodecylphenol, tetradecylphenol, hexadecylphenol, octadecylphenol, eicosylphenol, docosylphenol, and triacontylphenol. These monofunctional phenols having a relatively long chain alkyl group are effective when an improvement of the fluidity or hydrolytic resistance is required.

It is preferred that the reaction temperature is generally 0 to 40° C., the reaction time is several minutes to 5 hours, and the pH during the reaction is generally maintained at 10 or more.

The reaction conducted by a melt method is generally a transesterification reaction of a dihydric phenol and a carbonic diester, and a dihydric phenol and a carbonic diester are mixed in the presence of an inert gas and subjected to reaction under a reduced pressure generally at 120 to 350° C. The degree of vacuum is stepwise changed so that the pressure is finally 133 Pa or less, removing the formed phenols from the reaction system. The reaction time is generally about 1 to 4 hours.

Examples of carbonic diesters include diphenyl carbonate, dinaphthyl carbonate, bis(diphenyl) carbonate, dimethyl carbonate, diethyl carbonate, and dibutyl carbonate, and, of these, diphenyl carbonate is preferred.

For increasing the polymerization rate, a polymerization catalyst can be used, and examples of polymerization catalysts include catalysts generally used in an esterification reaction or a transesterification reaction, e.g., hydroxides of an alkali metal or an alkaline earth metal, such as sodium hydroxide and potassium hydroxide; hydroxides of boron or aluminum, alkali metal salts, alkaline earth metal salts, and quaternary ammonium salts; alkoxides of an alkali metal or an alkaline earth metal; organic acid salts of an alkali metal or an alkaline earth metal; a zinc compound, a boron compound, a silicon compound, a germanium compound, an organotin compound, a lead compound, an antimony compound, a manganese compound, a titanium compound, and a zirconium compound. These catalysts may be used individually or in combination. The amount of the polymerization catalyst used is selected from preferably the range of $1\times10^9$ to $1\times10^{-5}$ equivalent, more preferably $1\times10^{-8}$ to $5\times10^{-6}$ equivalent, relative to 1 mol of the dihydric phenol as a raw material.

Further, in the polymerization reaction, for reducing the phenolic end group, a compound, such as 2-chlorophenylphenyl carbonate, 2-methoxycarbonylphenylphenyl carbonate, or 2-ethoxycarbonylphenylphenyl carbonate, can be added in the late stage of or after completion of the polycondensation reaction.

Further, in the melt transesterification method, a deactivator for neutralizing the activity of the catalyst is preferably used. The deactivator is preferably used in an amount of 0.5 to 50 mol, relative to 1 mol of the remaining catalyst. Further, the deactivator is used in an amount of 0.01 to 500 ppm, more preferably 0.01 to 300 ppm, especially preferably 0.01 to 100 ppm, based on the aromatic polycarbonate obtained after the polymerization. Preferred examples of deactivators include phosphonium salts, such as tetrabutylphosphonium dodecylbenzenesulfonate, and ammonium salts, such as tetraethylammonium dodecylbenzylsulfate. Details of the methods and manners of the reaction other than those mentioned above are well known in books, patent documents, and the like.

The polycarbonate resin preferably has a viscosity average molecular weight of 14,000 to 100,000, more preferably 20,000 to 30,000, further preferably 22,000 to 28,000, especially preferably 23,000 to 26,000. When the molecular weight of the polycarbonate resin is outside of the above range and too small, it is likely that the resistance to a hard coat agent is unsatisfactory, and, when the molecular weight is outside of the above range and too large, it is likely that injection molding is difficult and the resultant molded article has caused a fracture or ununiform shade. When the molecular weight of the polycarbonate resin is in the above preferred range in which a satisfactory resistance to a hard coat agent is achieved, the resin composition of the invention can suppress ununiform shade which is caused in the molded article due to an irregular flow of the resin, enabling formation of excellent polycarbonate resin molded article having a hard coat layer. Further, when the molecular weight is in the above more preferred range, both excellent impact resistance and excellent moldability can be achieved. The polycarbonate resin may be one which is obtained by mixing a polycarbonate resin having a viscosity average molecular weight which is outside of the above-mentioned range.

A viscosity average molecular weight (M) of the polycarbonate resin is determined by determining a specific viscosity ($\eta_{sp}$) at 20° C. with respect to a solution obtained by dissolving 0.7 g of the polycarbonate res in in 100 ml of methylene chloride, and inserting the specific viscosity into the following formula.

$$\eta_{sp}/c = [\eta] + 0.45 \times [\eta]^2 c \text{ (wherein } [\eta] \text{ is an intrinsic viscosity)}$$

$$[\eta] = 1.23 \times 10^{-4} M^{0.83}$$

$$c = 0.7$$

As a mode of the polycarbonate resin in the invention, there can be mentioned the following polycarbonate resin. Specifically, there can be used an aromatic polycarbonate which comprises an aromatic polycarbonate (PC-i) having a viscosity average molecular weight of 70,000 to 300,000 and an aromatic polycarbonate (PC-ii) having a viscosity average molecular weight of 10,000 to 30,000, and which has a viscosity average molecular weight of 15,000 to 40,000, preferably 20,000 to 30,000 (hereinafter, referred to also as "high molecular-weight component-containing aromatic polycarbonate").

Such a high molecular-weight component-containing aromatic polycarbonate increases the entropy elasticity of the polymer due to the presence of PC-i, and thus is more advantageous in injection press molding which is preferably performed in the invention. For example, poor appearance, such as a hesitation mark, can be further suppressed, making it possible to expand the range of the conditions for injection press molding. On the other hand, the component PC-ii which is a low molecular-weight component reduces the melt viscosity of the whole resin to promote relaxation of the resin, enabling molding with a smaller strain. A similar effect is also recognized in a polycarbonate resin containing a branched component.

(Component B: Composite Tungsten Oxide Fine Particles)

The composite tungsten oxide fine particles (component B) are represented by the general formula: MxWyOz. In the formula, M represents at least one element selected from H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, and is preferably at least one element selected from the group consisting of Li, Na, K, Rb, Cs, Mg, Ca, Sr, and Ba, further preferably K, Rb, or Cs. Further, W represents tungsten, and O represents oxygen.

x, y, and z are numbers which satisfy the formulae: $0.001 \leq x/y \leq 1$, and $2.2 \leq z/y \leq 3.0$. Further, the ranges of x/y and z/y are, respectively, preferably $0.01 \leq x/y \leq 0.5$ and $2.7 \leq z/y \leq 3.0$, more preferably $0.2 \leq x/y \leq 0.4$ and $2.8 \leq z/y \leq 3.0$.

The composite tungsten oxide fine particles (component B) preferably have a particle diameter of 1 to 800 nm, more preferably 1 to 600 nm, further preferably 1 to 300 nm. When the particle diameter is smaller than 1 nm, it is likely that the aggregation effect is increased, causing the dispersibility to be poor, and, when the particle diameter is larger than 800 nm, it is likely that the resultant transparent resin molded article has a failure, such as an increased haze.

The composite tungsten oxide fine particles (component B) can be obtained by subjecting a tungsten compound which is a starting material to heat treatment in an inert gas atmosphere or a reducing gas atmosphere. The composite tungsten oxide fine particles obtained through the heat treatment have satisfactory near infrared ray-blocking power, and have advantageous properties as infrared ray-blocking fine particles.

The starting material for the composite tungsten oxide fine particles (component B) is a tungsten compound containing element M in the form of a simple substance of the element or a compound. Specifically, the starting material is preferably at least one member selected from the group consisting of a tungsten trioxide powder, a tungsten dioxide powder, a tungsten oxide hydrate, a tungsten hexachloride powder, an ammonium tungstate powder, a tungsten oxide hydrate powder obtained by dissolving tungsten hexachloride in an alcohol and then drying the resultant solution, a tungsten oxide hydrate powder obtained by dissolving tungsten hexachloride in an alcohol and then adding water to cause precipitation and drying the resultant precipitate, a tungsten compound powder obtained by drying an aqueous solution of ammonium tungstate, and a metal tungsten powder, each of which contains element M in the form of a simple substance of the element or a compound. When the starting material is in the form of a solution, the elements can be easily uniformly mixed with each other, and, from this point of view, an aqueous solution of ammonium tungstate or a tungsten hexachloride solution is further preferably used. By subjecting the above starting raw material to heat treatment in an inert gas atmosphere or a reducing gas atmosphere, the above-mentioned composite tungsten oxide fine particles can be obtained.

For producing the tungsten compound which is a starting material in which molecules of the individual components are uniformly mixed with each other, it is preferred that each raw material is mixed in the form of a solution, and the tungsten compound containing element M is preferably soluble in a solvent, such as water or an organic solvent. Examples of such compounds include a tungstate, a chloride, a nitrate, a sulfate, an oxalate, an oxide, a carbonate, and a hydroxide, each of which contains element M, but the compound is not limited to these, and is preferably any compound which can be in the form of a solution.

The raw material for producing the composite tungsten oxide fine particles (component B) is further described below in detail.

As a starting material for obtaining the composite tungsten oxide fine particles (component B) represented by the general formula: MxWyOz, a powder obtained by mixing a tungsten oxide powder and the element M powder can be used. Examples of tungsten oxide powders include a tungsten trioxide powder, a tungsten dioxide powder, a tungsten oxide hydrate, a tungsten hexachloride powder, an ammonium tungstate powder, a tungsten oxide hydrate powder obtained by dissolving tungsten hexachloride in an alcohol and then drying the resultant solution, a tungsten oxide hydrate powder obtained by dissolving tungsten hexachloride in an alcohol and then adding water to cause precipitation and drying the resultant precipitate, a tungsten compound powder obtained by drying an aqueous solution of ammonium tungstate, and a metal tungsten powder. Examples of element M powders include a powder of a simple substance or compound containing element M. Further, when the tungsten compound which is a starting material for obtaining the composite tungsten oxide fine particles (component B) is in the form of a solution or a dispersion, the elements can be easily and uniformly mixed. From this point of view, the starting material for the composite tungsten oxide fine particles (component B) is further preferably a powder obtained by mixing an alcohol solution of tungsten hexachloride or an aqueous solution of ammonium tungstate and a solution of a compound containing the element M and then drying the resultant mixture. Similarly, the starting material for the composite tungsten oxide fine particles (component B) is preferably a powder obtained by mixing a dispersion, which is obtained by dissolving tungsten hexachloride in an alcohol and then adding water to cause precipitation, and a powder of a simple substance or compound containing the element M or a solution of a compound containing the element M, and then drying the resultant mixture.

Examples of compounds containing the element M include a tungstate, a chloride, a nitrate, a sulfate, an oxalate, an oxide, a carbonate, and a hydroxide of element M, but the compound is not limited to these, and is preferably any compound which can be in the form of a solution. Further, when industrially producing the composite tungsten oxide fine particles (component B), a method using a tungsten oxide hydrate powder or tungsten trioxide and a carbonate or hydroxide of the element M is a preferred method for producing the component B because a harmful gas or the like is not generated on the stage of a heat treatment or the like.

With respect to the composite tungsten oxide fine particles (component B), conditions for the heat treatment in an inert atmosphere are preferably 650° C. or higher. The starting material which has been subjected to heat treatment at 650° C. or higher has satisfactory near infrared ray-blocking power and is efficient as infrared ray-blocking fine particles. As an inert gas, an inert gas, such as Ar or $N_2$, is advantageously used.

Further, conditions for the heat treatment in a reducing atmosphere are preferably such that the starting material is first subjected to heat treatment in a reducing gas atmosphere at 100 to 850° C., and then subjected to heat treatment in an inert gas atmosphere at a temperature of 650 to 1,200° C. The reducing gas used in this instance is not particularly limited, but is preferably $H_2$. When $H_2$ is used as the reducing gas, with respect to the composition of the reducing atmosphere, $H_2$ is preferably contained in an amount of 0.1% or more, further preferably 2% or more, in terms of a volume ratio. When $H_2$ is contained in an amount of 0.1% or more, in terms of a volume ratio, reduction can efficiently proceed.

From the viewpoint of improving the weathering resistance, it is preferred that the surface of the composite tungsten oxide fine particles (component B) is coated with an oxide containing at least one metal of Si, Ti, Zr, and Al. With respect to the coating method, there is no particular limitation, but the surface of the composite tungsten oxide fine particles (component B) can be coated by adding an alkoxide of the above-mentioned metal to a solution having dispersed therein the composite tungsten oxide fine particles (component B).

Further, it is preferred that the composite tungsten oxide fine particles (component B) are coated with a dispersant. Examples of dispersants include polycarbonate, polysulfone, polyacrylonitrile, polyarylate, polyethylene, polyvinyl chloride, polyvinylidene chloride, a fluororesin, polyvinyl butyral, polyvinyl alcohol, polystyrene, a silicone resin, and derivatives thereof. Coating the particles with the dispersant has an effect such that the dispersibility of the particles is improved when added to a resin, further preventing lowering of the mechanical physical properties. As an example of a method for coating the particles with a dispersant, there can be mentioned a method in which the composite tungsten oxide fine particles (component B) and a dispersant are dissolved in a solvent, such as toluene, and stirred to prepare a dispersion, and then the solvent is removed from the dispersion by a treatment, such as vacuum drying, to coat the composite tungsten oxide fine particles (component B) with the dispersant.

Further, as examples of methods for adding the component B to the polycarbonate resin (component A), there can be mentioned a method in which the composite tungsten oxide fine particles (component B) or coated composite tungsten oxide fine particles (component B) are directly added to the polycarbonate resin, and a method in which the component B is diluted with the polycarbonate resin (component A) in an amount 1 to 100 times the component B and then added to the polycarbonate resin.

The amount of the component B contained, relative to 100 parts by weight of the component A, is 0.0001 to 0.2 part by weight, preferably 0.001 to 0.1 part by weight, more preferably 0.002 to 0.05 part by weight. When the amount of the component B contained is less than 0.0001 part by weight, the infrared ray-blocking ability cannot be satisfactorily exhibited, and, when the amount of the component B contained is more than 0.2 part by weight, the moist heat resistance becomes poor, and further the total light transmittance is disadvantageously markedly reduced.

(Component C: Epoxy Resin)

The resin composition of invention contains an epoxy resin as the component C for the purpose of having an infrared ray-blocking ability with excellent moist heat resistance while maintaining high transparency. The epoxy resin used is preferably an epoxy polymer containing a glycidyl group, more preferably an epoxy polymer containing glycidyl methacrylate in the copolymer, and polystyrene is preferably used as another component of the copolymer. Especially, a polyglycidyl methacrylate-polystyrene copolymer is preferably used. When an epoxy polymer containing no glycidyl group is used, the compatibility with the component A is likely to be poor, so that the transparency is poor. Examples of monomer components of the polymer containing a glycidyl group include allylglycidyl ether, glycidyl methacrylate, glycidyl acrylate, 4-hydroxybutyl acrylate glycidyl ether, 1,2-epoxy-5-hexene, 1,2-epoxy-9-decene, and epoxysuccinic acid, and examples of the polymers include terminal epoxy-modified polydimethylsiloxane and side-chain epoxy-modified polydimethylsiloxane.

The amount of the component C contained, relative to 100 parts by weight of the component A, is 0.0001 to 0.1 part by weight, preferably 0.001 to 0.05 part by weight, more preferably 0.001 to 0.03 part by weight. When the amount of the component C contained is less than 0.0001 part by weight, a satisfactory moist heat resistance is not exhibited, and, when the amount of the component C contained is more than 0.1 part by weight, the hue becomes poor, causing the transparency to be poor.

(Component D: Release Agent)

The resin composition of the invention contains, as the component D, a release agent which is a fatty acid ester containing as a main component a full ester of a fatty acid and a polyhydric alcohol for the purpose of having an infrared ray-blocking ability with excellent moist heat resistance while maintaining high transparency.

The fatty acid preferably has 3 to 32 carbon atoms, and especially preferred is a fatty acid having 10 to 32 carbon atoms. Examples of the fatty acids include saturated aliphatic carboxylic acids, such as decanoic acid, undecanoic acid, dodecanoic acid, tridecanoic acid, tetradecanoic acid, pentadecanoic acid, hexadecanoic acid (palmitic acid), heptadecanoic acid, octadecanoic acid (stearic acid), nonadecanoic acid, behenic acid, icosanoic acid, and docosanoic acid, and unsaturated fatty acids, such as palmitoleic acid, oleic acid, linoleic acid, linolenic acid, eicosenoic acid, eicosapentaenoic acid, and cetoleic acid. Among these, preferred are fatty acids having 14 to 20 carbon atoms. Of these, saturated fatty acids are preferred. Especially preferred are stearic acid and palmitic acid. The above-mentioned fatty acids, such as stearic acid and palmitic acid, are generally produced from natural fats and oils, e.g., animal fats and oils, such as beef tallow and lard, or vegetable fats and oils, such as palm oil and sunflower oil, and therefore these fatty acids are generally a mixture containing another carboxylicacid component having the different number of carbon atoms. Therefore, in the production of the fatty acid ester in the invention, a fatty acid which is produced from natural fats and oils, and which is in the form of a mixture containing another carboxylic acid component, especially stearic acid or palmitic acid is preferably used.

Examples of the polyhydric alcohols include pentaerythritol, dipentaerythritol, tripentaerythritol, polyglycerol (tri- to hexaglycerol), ditrimethylolpropane, xylitol, sorbitol, and mannitol. In the fatty acid ester in the invention, dipentaerythritol is preferred.

The fatty acid ester in the invention is a full ester. When a partial ester is used, a satisfactory moist heat resistance is not exhibited. In view of the thermal stability, the fatty acid ester in the invention preferably has an acid value of 20 or less, more preferably in the range of from 4 to 20, further preferably in the range of from 4 to 12. The acid value can be substantially zero. The fatty acid ester preferably has a hydroxyl value in the range of from 0.1 to 30. Further, the fatty acid ester preferably has an iodine value of 10 or less. The iodine value can be substantially zero. These characteristic values can be determined by the method described in JIS K 0070.

In view of the above, the component D is preferably a fatty acid ester represented by the following formula (1):

[Chem. 1]

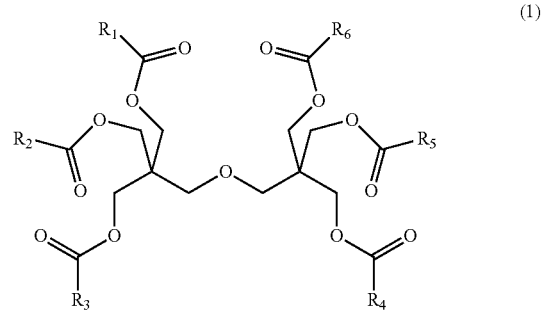

wherein $R_1$ to $R_6$ are the same or different and independently an alkyl group having 10 to 32 carbon atoms.

The amount of the component D contained, relative to 100 parts by weight of the component A, is 0.001 to 0.5 part by weight, preferably 0.01 to 0.4 part by weight, more preferably 0.05 to 0.3 part by weight. When the amount of the component D contained is less than 0.001 part by weight, a satisfactory moist heat resistance is not exhibited, and, when the amount of the component D contained is more than 0.5 part by weight, the molecular weight of the polycarbonate resin composition is reduced during molding.

(Component E: Heat Stabilizer)

It is preferred that the resin composition of the invention contains a heat stabilizer as the component E. With respect to the heat stabilizer, at least one heat stabilizer selected from the group consisting of a phenolic stabilizer (component E-1), a sulfur stabilizer (component E-2), and a phosphorus stabilizer (component E-3) is preferred. The amount of the component E contained, relative to 100 parts by weight of the component A, is preferably 0.0002 to 0.8 part by weight, more preferably 0.001 to 0.7 part by weight, further preferably 0.01 to 0.1 part by weight. When the amount of the component E contained is less than 0.0002 part by weight, the effect for thermal stability is likely not to be exhibited, and, when the amount of the component E contained is more than 0.8 part by weight, it is likely that the hue stability upon molding cannot be maintained when used together with the composite tungsten oxide fine particles.

(Component E-1: Phenolic Stabilizer)

Examples of phenolic stabilizers include α-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol)2,2'-ethyl idene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexanediol bis[3-(3,5-di-tert-butyl-4-hydroxyphenyl) propionate], bis[2-tert-butyl-4-methyl6-(3-tert-butyl-5-methyl-2-hydroxybenzyl) phenyl] terephthalate, 3,9-bis{2-[3-(3-tert-butyl-4-hydroxy-5-methylphenyl)propionyloxy]-1,1-dimethylethyl}-2,4,8, 10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-di-thiobis(2,6-di-tert-butylphenol), 4,4'-tri-thiobis(2,6-di-tert-butylphenol), 2,2'-thiodiethylenebis-[3-(3,5-di-tert-butyl-4-hydroxyphenyl) propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tert-butyl-3-hydroxy-2,6-dimethylbenzyl) isocyanurate, 1,3,5-tris2[3(3,5-di-tert-butyl-4-hydroxyphenyl)propionyloxy]ethyl isocyanurate, and tetrakis[methylene-3-(3',5'-di-tert-butyl-4-hydroxyphenyl) propionate]methane. All of these stabilizers are easily available. The above phenolic stabilizers can be used individually or in combination.

(Component E-2: Sulfur Stabilizer)

Examples of sulfur compounds include dilauryl thiodipropionate, ditridecyl thiodipropionate, dimyristyl thiodipropionate, distearyl thiodipropionate, pentaerythritol tetrakis(3-lauryl thiopropionate), pentaerythritol tetrakis(3-dodecyl thiopropionate), pentaerythritol tetrakis(3-octadecyl thiopropionate), pentaerythritol tetrakis(3-myristyl thiopropionate), and pentaerythritol tetrakis(3-stearyl thiopropionate). These may be used individually or in combination.

(Component E-3: Phosphorus Stabilizer)

The phosphorus stabilizer has been widely known as a heat stabilizer for aromatic polycarbonate. In the invention, the phosphorus stabilizer improves the resin composition in thermal stability to such an extent that the resin composition can endure an extremely severe thermal burden. As examples of phosphorus stabilizers, there can be mentioned mainly a phosphite compound and a phosphonite.

Examples of phosphite compounds include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenylphosphite, monobutyldiphenyl phosphite, monodecyldiphenyl phosphite, monooctyldiphenyl phosphite, 2,2-methylenebis(4,6-di-1-tert-butylphenyl)octyl phosphite, tris(diethylphenyl) phosphite, tris(di-iso-propylphenyl) phosphite, tris(di-n-butylphenyl) phosphite, tris(2,4-di-tert-butylphenyl) phosphite, tris(2,6-di-tert-butylphenyl) phosphite, distearylpentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)nentaerythritol diphosphite, phenylbisphenol A pentaerythritol diphosphite, bis(nonylphenyl)pentaerythritol diphosphite, and dicyclohexylpentaerythritol diphosphite.

Further another phosphite compound which has reacted with a dihydric phenol to have a cyclic structure can be used. Examples include 2,2'-methylenebis(4,6-di-tert-butylphenyl)(2,4-di-tert-butylphenyl) phosphite, 2,2'-methylenebis(4,6-di-tert-butylphenyl)(2-tert-butyl-4-methylphenyl) phosphite, 2,2'-methylenebis(4-methyl-6-tert-butylphenyl)(2-tert-butyl-4-methylphenyl) phosphite, and 2,2'-ethylidenebis(4-methyl-6-tert-butylphenyl)(2-tert-butyl-4-methylphenyl) phosphite.

Examples of phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite, and preferred are tetrakis(di-tert-butylphenyl)-biphenylene diphosphonite and bis(di-tert-butylphenyl)-phenyl-phenyl phosphonite, and more preferred are tetrakis(2,4-di-tert-butylphenyl)-biphenylene diphosphonite and bis(2,4-di-tert-butylphenyl)-phenyl-phenyl phosphonite. The phosphonite compound and a phosphite compound having an aryl group substituted with two or more alkyl groups can be preferably used in combination.

(Component F: Ultraviolet Light Absorber)

The resin composition of the invention is frequently used without subjected to coating or the like. In such a case, the resin composition may be required to have excellent light resistance, and therefore preferably has incorporated thereinto an ultraviolet light absorber.

With respect to the ultraviolet light absorber, at least one ultraviolet light absorber selected from the group consisting of a benzotriazole ultraviolet light absorber (component F-1), a triazine ultraviolet light absorber (component F-2), and an oxazine ultraviolet light absorber (component F-3) is preferred. The amount of the component F contained, relative to 100 parts by weight of the component A, is preferably 0.1 to 2 parts by weight, more preferably 0.12 to 1.5 parts by weight, further preferably 0.15 to 1 part by weight. When the amount of the component F contained is less than 0.1 part by weight, the satisfactory light resistance is likely not to be exhibited, and, when the amount of the component F contained is more than 2 parts by weight, it is likely that gas generation causes the appearance to be poor or causes the physical properties to be lowered.

(Component F-1: Benzotriazole Ultraviolet Light Absorber)

Examples of benzotriazole ultraviolet light absorbers include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzo triazol-2-yl)phenol], 2-(2-hydroxy-3,5-di-tert-butylphenyl) benzotriazole, 2-(2-hydroxy-3,5-di-tert-butylphenyl)-5-chlorobenzotriazol e, 2-(2-hydroxy-3,5-di-tert-amylphenyl) benzotriazole, 2-(2-hydroxy-5-tert-octylphenyl) benzotriazole, 2-(2-hydroxy-5-tert-butylphenyl) benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), 2-(2-hydroxy-3-(3,4,5,6-tetrahydrophthalimidomethyl)-5-methylphenyl]benzotriazole, and polymers having a 2-hydroxyphenyl-2H-benzotriazole skeleton, such as a copolymer of 2-(2'-hydroxy-5-methacryloxyethylphenyl)-2H-benzotriazole and a vinyl monomer copolymerizable with the monomer, and a copolymer of 2-(2'-hydroxy-5-acryloxyethylphenyl)-2H-benzotriazole and a vinyl monomer copolymerizable with the monomer.

(Component F-2: Triazine Ultraviolet Light Absorber)

Examples of triazine ultraviolet light absorbers include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6- diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Further examples include the same compounds as the compounds mentioned above except that the phenyl group is replaced by a 2,4-dimethylphenyl group, such as 2-(4,6-bis(2,4-dimethylphenyl)-1,3,5-triazin-2-yl)-5-hexyloxyphenol.
(Component F-3: Oxazine Ultraviolet Light Absorber)

Examples of oxazine ultraviolet light absorbers include 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one).
(Other Components)
(1) Dye and Pigment The resin composition of the invention can contain various types of dyes and pigments, providing a molded article exhibiting a variety of design properties. Examples of dyes and pigments used in the invention include a perylene dye, a coumarin dye, a thioindigo dye, an anthraquinone dye, a thioxanthone dye, ferrocyanide of Prussian blue or the like, a perinone dye, a quinoline dye, a quinacridone dye, a dioxazine dye, an isoindolinone dye, a phthalocyanine dye, carbon black, titanium oxide, zinc oxide, zinc sulfide, calcium carbonate, and metal oxide fine particles. Further, the polycarbonate resin composition of the invention can obtain more excellent metallic color by having incorporated a metallic pigment. As a metallic pigment, an aluminum powder is preferred. Further, by incorporating a fluorescent brightener or another fluorescent dye emitting a light into the resin composition, a further excellent design effect utilizing the color emitted can be imparted to the resin composition. Examples of fluorescent dyes (including a fluorescent brightener) used in the invention include a coumarin fluorescent dye, a benzopyran fluorescent dye, a perylene fluorescent dye, an anthraquinone fluorescent dye, a thioindigo fluorescent dye, a xanthene fluorescent dye, a xanthone fluorescent dye, a thioxanthene fluorescent dye, a thioxanthone fluorescent dye, a thiazine fluorescent dye, and a diaminostilbene fluorescent dye. Of these, preferred are a coumarin fluorescent dye, a benzopyran fluorescent dye, and a perylene fluorescent dye which have such excellent heat resistance that they are unlikely to suffer deterioration during molding of the polycarbonate resin.
(2) Nitride Fine Particles It is preferred that the resin composition of the invention contains nitride fine particles. The nitride fine particles are preferably fine particles of a nitride of at least one metal selected from the group consisting of Ti, Zr, Hf, V, Nb, and Ta.
(Production of the Resin Composition)

In producing the resin composition of the invention, an arbitrary method is employed. For example, there can be mentioned a method in which the components and other optional components are premixed, and then melt-kneaded and pelletized. Examples of premixing means include a Nauta mixer, a twin-cylinder mixer, a Henschel mixer, a mechanochemical machine, and an extrusion mixer. In the premixing, granulation by means of an extrusion granulator, a briquetting machine, or the like can be optionally conducted. After the premixing, the resultant mixture is melt-kneaded by a melt kneading machine, such as a vented twin-screw extruder, and pelletized by an apparatus, such as a pelletizer. As further examples of melt kneading machines, there can be mentioned a Banbury mixer, a mixing roll, and a thermostatic stirrer, but preferred is a vented twin-screw extruder. Alternatively, there can be employed a method in which the components and other optional components are not premixed but individually and independently fed to a melt kneading machine, such as a twin-screw extruder.
(Production of a Molded Article)

With respect to the above-obtained resin composition of the invention, generally, the pellets produced from the resin composition as mentioned above are subjected to injection molding, producing various types of products. Further, without producing the pellets, the resin melt-kneaded by an extruder can be directly formed into a sheet, a film, a profile extruded article, and an injection molded article.

In the injection molding, a molded article can be obtained not only by a general molding method but also using an injection molding method appropriately selected according to the object, such as injection compression molding, injection press molding, gas-assisted injection molding, foam molding (including foam molding by pouring of a supercritical fluid), insert molding, in-mold coating molding, insulated mold molding, rapid heating-and-cooling mold molding, two-color molding, sandwich molding, or ultra-high speed injection molding. Advantages of these various molding methods have been widely known. Any of molding of a cold-runner system and molding of a hot-runner system can be selected. The resin composition of the invention can be formed into various types of profile extruded articles and a sheet by extrusion. It is preferred that the molded article is subjected to hard coat treatment with respect to one surface or both surfaces thereof.

The molded article preferably has a thickness of 0.1 to 20 mm, more preferably 0.1 to 15 mm. Further, the molded article preferably has a total light transmittance of 20% or more, more preferably 30% or more, as measured in accordance with ISO 9050. Furthermore, the molded article preferably has a haze of 5% or less, more preferably 3% or less, as measured in accordance with ISO 9050.

The embodiments that the present inventor practices intensively describe the preferred ranges of the above-mentioned requirements, and, for example, representative examples of the embodiments are described in the Examples below. Needless to say, the present invention is not limited to these embodiments.

EXAMPLES

Hereinbelow, the present invention will be described in more detail with reference to the following Examples. In the following Examples, "part(s)" indicates "part(s) by weight" and "%" indicates "% by weight" unless otherwise specified.
(1) Preparation of a Resin Composition
(1-1) Raw Materials Used
(Component A)

A-1: Polycarbonate resin powder having a molecular weight of 24,200 obtained by the following method.

A three-stage six-blade stirrer and a reflux condenser were fitted to a reaction vessel having a baffle. In the reaction vessel were placed 45.6 parts of bisphenol A, p-tert-butylphenol in an amount of 2.78 mol %, based on bisphenol A, 265 parts of dichloromethane, and 200 parts of water, and the reaction vessel was purged with nitrogen to remove oxygen from the reaction vessel. On this stage, the contents of the reaction vessel occupied nearly 80% of the volume of the vessel. Then, to the resultant suspension was fed about 80 parts of an aqueous solution for feeding 0.09 part of sodium hydrosulfite and 21.8 parts of sodium hydroxide, and bisphenol A was dissolved at 15° C. While stirring, 23.35 parts of phosgene was fed to the resultant mixture for 30 minutes. Then, 0.016 part of triethylamine (0.08 mol %, based on bisphenol A) was added and the resultant mixture was stirred for 60 minutes, terminating the reaction. Subsequently, the reaction mixture was allowed to stand, and the organic phase was separated. Methylene chloride was added to the obtained dichloromethane solution of a polycarbonate resin to obtain a solution having a concentration of 14% by weight, and further the solution was subjected to treatment using a centrifugal extractor having a perforated plate (KCC Centrifugal Extractor, manufactured by Kawasaki Engineering Co., Ltd.) under conditions at 3,500 rpm by feeding a 0.5% aqueous solution of sodium hydroxide at a flow rate of 1,000 ml/min and feeding the organic phase at a flow rate of 1,000 ml/min, and then the organic phase was rendered acidic with hydrochloric acid and then washed with water repeatedly, and, at a time when the conductivity of the aqueous phase became almost the same as that of ion-exchanged water, methylene chloride was evaporated to obtain a polycarbonate resin powder.

(Component B)
- B-1: Heat ray absorber composed of about 23% by weight of $Cs_{0.33}WO_3$ and an organic dispersed resin (YMDS-874R, manufactured by Sumitomo Metal Mining Co., Ltd.)

(Component C)
- C-1: Epoxy resin (G-0250SP, manufactured by NOF Corporation)
- C-2: Epoxy resin (G-0150M, manufactured by NOF Corporation)

(Component D)
- D-1: Fatty acid full ester (which has a structure represented by the formula (1)) (L-8483, manufactured by Riken Vitamin Co., Ltd.)
- D-2: Fatty acid full ester (which has a structure represented by the formula (1)) (SL-02, manufactured by Riken Vitamin Co., Ltd.)
- D-3: Fatty acid full ester (which does not have a structure represented by the formula (1)) (H-874S, manufactured by NOF Corporation)
- D-4: Fatty acid partial ester (S-100A, manufactured by Riken Vitamin Co., Ltd.)

(Component E)
- E-1: Phenolic stabilizer (IRGANOX1076, manufactured by BASF Japan Ltd.)
- E-2: Sulfur stabilizer (IRGANOXL115, manufactured by BASF Japan Ltd.)
- E-3: Phosphorus stabilizer (P-EPQ, manufactured by Clariant Japan K.K.)

(Component F)
- F-1: Benzotriazole ultraviolet light absorber (KEMISORB 79, manufactured by Chemipro Kasei Kaisha, Ltd.)
- F-2: Benzotriazine ultraviolet light absorber (Tinuvin1577ED, manufactured by BASF Japan Ltd.)
- F-3: Oxazine ultraviolet light absorber (UV0901, manufactured by Kinkai Chemicals)

(2) Preparation of a Test Specimen (2-1) Production of a Resin Composition

The components shown in Tables 1 and 2 were weighed in their respective amounts shown in Tables 1 and 2 and mixed using a blender, and then melt-kneaded using a vented twin-screw extruder, obtaining pellets of a polycarbonate resin composition. The amount of the component B contained corresponds to the amount in brackets of $Cs_{0.33}WO_3$, which is an inorganic ultraviolet light absorbing material, contained in B-1. (The figures outside the brackets indicate the amount of B-1 in the resin composition, in terms of part by weight.) With respect to each of the additives to be added to the polycarbonate resin, a premix of the additive and the polycarbonate resin at a 10- to 100-fold concentration of the amount of the additive to be incorporated as a yardstick was preliminarily prepared, and then mixed into the whole of the resin using a blender. As a vented twin-screw extruder, TEX30α, manufactured by The Japan Steel Works, Ltd. (complete intermeshing; revolution in the same direction; two-start screw) was used. The extruder was of a type having one kneading zone before the vent hole. Conditions for extrusion were such that the discharge rate was 20 kg/h, the screw revolution speed was 130 rpm, the degree of vacuum for vent was 3 kPa, and the extrusion temperature from the first feed opening to the dice portion was 290° C. The above-mentioned production of the resin composition was performed in an atmosphere in which air cleaned through a HEPA filter was circulated, while taking care satisfactorily not to mix foreign matter during the operation.

(2-2) Method for Preparing a Test Specimen

The obtained pellets were dried using a circulating hot air dryer at 110 to 120° C. for 6 hours, and then a plate having a size of width: 150 mm×length: 150 mm×thickness: 5 mm, which is a test specimen for evaluation, was molded from the pellets using an injection molding machine [SG260M-HP, manufactured by Sumitomo Heavy Industries, Ltd.] under conditions such that the cylinder temperature was 300° C. and the mold temperature was 80° C.

(3) Evaluation Items (3-1) Viscosity Average Molecular Weight of a Test Specimen A test specimen which was pulverized into pieces, about 3 mm square, was mixed with methylene chloride in a weight 20 to 30 times the weight of the specimen to dissolve the soluble component of the composition. Then, the soluble component was taken out by filtration through celite. Subsequently, the solvent in the resultant solution was removed, and the solid obtained after removing the solvent was satisfactorily dried to obtain a solid of the component soluble in methylene chloride. With respect to a solution obtained by dissolving 0.7 g of the solid in 100 ml of methylene chloride, a specific viscosity at 20° C. was determined and a viscosity average molecular weight was determined from the specific viscosity in the same manner as in the above-mentioned determination of a viscosity average molecular weight of the polycarbonate resin.

(3-2) Change of the Infrared Ray-Blocking Ability after the Moist Heat Resistance Test A test specimen, 50 mm square, was cut out from the test specimen. The test specimen was subjected to spectrophotometry measurement using Spectrophotometer U-4100, manufactured by Hitachi High-Technologies Corporation, and an initial Total transmission of solar energy (Tts) was determined in accordance with ISO 13837. The results are shown in Tables 1 and 2. Then, the test specimen was subjected to wet heat treatment using Pressure cooker test machine TPC-412 (manufactured by ESPEC CORP.) under conditions at 120° C. and at 75% Rh for 48 hours, and a Tts of the resultant specimen was determined by the same method as mentioned above. A difference between the Its after the pressure cooker test and the initial Tts was calculated and taken as a change (ΔTts) of the infrared ray-blocking ability after the moist heat resistance test. The results are shown in Tables 1 and 2.

(3-3) Total Light Transmittance and Haze

A test specimen, 50 mm square, was cut out from the test specimen, and, using Haze meter HR-100, manufactured by Murakami Color Research Laboratory, a total light transmittance and a haze were measured in accordance with ISO 13468. The results are shown in Tables 1 and 2.

TABLE 1

| | | | | | Example | | | | | | |
|---|---|---|---|---|---|---|---|---|---|---|---|
| | | | | Unit | 1 | 2 | 3 | 4 | 5 | 6 | 7 |
| Composition | Component A | PC | A | Part(s) by weight | 100 | 100 | 100 | 100 | 100 | 100 | 100 |
| | Component B | CWO | B | | 0.09 (0.15) | 0.09 (0.02) | 0.5 (0.12) | 0.09 (0.02) | 0.09 (0.02) | 0.09 (0.02) | 0.09 (0.02) |
| | Component C | Epoxy | C-1 | | 0.0075 | 0.0075 | 0.0075 | — | 0.0075 | 0.0075 | 0.0075 |
| | | | C-2 | | — | — | — | 0.0075 | — | — | — |
| | Component D | Release agent | D-1 | | 0.1 | 0.1 | 0.1 | 0.1 | — | — | 0.1 |
| | | | D-2 | | — | — | — | — | 0.1 | — | — |
| | | | D-3 | | — | — | — | — | — | 0.1 | — |
| | | | D-4 | | — | — | — | — | — | — | — |
| | Component E | Heat stabilizer | E-1 | | — | 0.05 | 0.05 | 0.05 | 0.05 | 0.05 | — |
| | | | E-2 | | — | — | — | — | — | — | 0.05 |
| | | | E-3 | | — | — | — | — | — | — | — |
| | Component F | Ultraviolet light absorber | F-1 | | — | 0.3 | 0.3 | 0.3 | 0.3 | 0.3 | 0.3 |
| | | | F-2 | | — | — | — | — | — | — | — |
| | | | F-3 | | — | — | — | — | — | — | — |
| Evaluation | Moist heat resistance | Tts | Initial | — | 52.0 | 52.0 | 35.1 | 51.0 | 50.8 | 52.1 | 51.5 |
| | | | After moist heat test | — | 53.6 | 53.6 | 37.5 | 52.6 | 52.4 | 54.6 | 53.2 |
| | | | Δ | — | 1.6 | 1.6 | 2.4 | 1.5 | 1.5 | 2.5 | 1.7 |
| | Optical properties | Total light transmittance | | % | 71.5 | 72.7 | 40.0 | 72.4 | 71.8 | 72.8 | 72.5 |
| | | Haze | | — | 1.0 | 0.9 | 2.4 | 0.8 | 0.8 | 0.7 | 0.8 |
| | Heat resistance upon molding | Viscosity average molecular weight of test specimen | | — | 23600 | 23600 | 23600 | 23700 | 23700 | 23600 | 23700 |

| | | | | | Example | | | | | |
|---|---|---|---|---|---|---|---|---|---|---|
| | | | | Unit | 8 | 9 | 10 | 11 | 12 | 13 |
| Composition | Component A | PC | A | Part(s) by weight | 100 | 100 | 100 | 100 | 100 | 100 |
| | Component B | CWO | B | | 0.09 (0.02) | 0.09 (0.02) | 0.09 (0.02) | 0.09 (0.02) | 0.09 (0.02) | 0.09 (0.02) |
| | Component C | Epoxy | C-1 | | 0.0075 | 0.0075 | 0.0075 | 0.001 | 0.08 | 0.0075 |
| | | | C-2 | | — | — | — | — | — | — |
| | Component D | Release agent | D-1 | | 0.1 | 0.1 | 0.1 | 0.1 | 0.1 | 0.4 |
| | | | D-2 | | — | — | — | — | — | — |
| | | | D-3 | | — | — | — | — | — | — |
| | | | D-4 | | — | — | — | — | — | — |
| | Component E | Heat stabilizer | E-1 | | — | 0.05 | 0.05 | 0.05 | 0.05 | 0.05 |
| | | | E-2 | | — | — | — | — | — | — |
| | | | E-3 | | 0.05 | — | — | — | — | — |
| | Component F | Ultraviolet light absorber | F-1 | | 0.3 | — | — | 0.3 | 0.3 | 0.3 |
| | | | F-2 | | — | 0.3 | — | — | — | — |
| | | | F-3 | | — | — | 0.3 | — | — | — |
| Evaluation | Moist heat resistance | Tts | Initial | — | 52.0 | 52.2 | 51.8 | 52.5 | 50.5 | 51.4 |
| | | | After moist heat test | — | 53.8 | 54 | 53.5 | 54.8 | 52.2 | 52.5 |
| | | | Δ | — | 1.8 | 1.8 | 1.7 | 2.3 | 1.7 | 1.1 |
| | Optical properties | Total light transmittance | | % | 72.8 | 72 | 71.9 | 72.9 | 71.7 | 72.3 |
| | | Haze | | — | 0.8 | 0.8 | 0.8 | 0.6 | 1.2 | 1.0 |
| | Heat resistance upon molding | Viscosity average molecular weight of test specimen | | — | 23700 | 23800 | 23700 | 23700 | 23700 | 23000 |

TABLE 2

| | | | Unit | Comparative Example 1 | 2 | 3 | 4 | 5 | 6 | 7 |
|---|---|---|---|---|---|---|---|---|---|---|
| Composition | Component A | PC | A | Part(s) by weight | 100 | 100 | 100 | 100 | 100 | 100 | 100 |
| | Component B | CWO | B | | — | 1.3 (0.30) | 0.09 (0.02) | 0.09 (0.02) | 0.09 (0.02) | 0.09 (0.02) | 0.09 (0.02) |
| | Component C | Epoxy | C-1 | | 0.0075 | 0.0075 | — | 0.2 | 0.0075 | 0.0075 | 0.0075 |
| | | | C-2 | | — | — | — | — | — | — | — |
| | Component D | Release agent | D-1 | | 0.1 | 0.1 | 0.1 | 0.1 | — | — | 1.0 |
| | | | D-2 | | — | — | — | — | — | — | — |
| | | | D-3 | | — | — | — | — | — | — | — |
| | | | D-4 | | — | — | — | — | 0.1 | — | — |
| | Component E | Heat stabilizer | E-1 | | 0.05 | 0.05 | 0.05 | 0.05 | 0.05 | 0.05 | 0.05 |
| | | | E-2 | | — | — | — | — | — | — | — |
| | | | E-3 | | — | — | — | — | — | — | — |
| | Component F | Ultraviolet light absorber | F-1 | | 0.3 | 0.3 | 0.3 | 0.3 | 0.3 | 0.3 | 0.3 |
| | | | F-2 | | — | — | — | — | — | — | — |
| | | | F-3 | | — | — | — | — | — | — | — |
| Evaluation | Moist heat resistance | Tts | Initial | — | — | 85.3 | 24.1 | 52.3 | 50.0 | 51.0 | 51.5 | 51.3 |
| | | | After moist heat test | — | — | 85.5 | 27.9 | 55.4 | 51.7 | 54.5 | 55.2 | 52.4 |
| | | | Δ | — | — | 0.2 | 3.8 | 3.1 | 1.7 | 3.5 | 3.7 | 1.1 |
| | Optical properties | Total light transmittance | | % | 91.0 | 21.5 | 73.6 | 70.6 | 73.1 | 73.2 | 70.9 |
| | | Haze | | — | 0.3 | 5.5 | 0.7 | 6.0 | 0.7 | 0.9 | 2.4 |
| | Heat resistance upon molding | Viscosity average molecular weight of test specimen | | — | 23900 | 23700 | 23700 | 23500 | 23800 | 23900 | 20100 |

The invention claimed is:

1. A resin composition containing, relative to (A) 100 parts by weight of a polycarbonate resin (component A), (B) 0.02 to 0.15 part by weight of composite tungsten oxide fine particles (component B) represented by the general formula: MxWyOz (wherein M represents at least one element selected from an alkali metal, W represents tungsten, O represents oxygen, $0.001 \leq x/y \leq 1$, and $2.2 \leq z/y \leq 3.0$), (C) 0.001 to 0.08 part by weight of an epoxy resin (component C), and (D) 0.1 to 0.4 part by weight of a release agent which is a fatty acid ester containing as a main component a full ester of a fatty acid and a polyhydric alcohol (component D), wherein the component (D) is a fatty acid ester represented by the following formula (1):

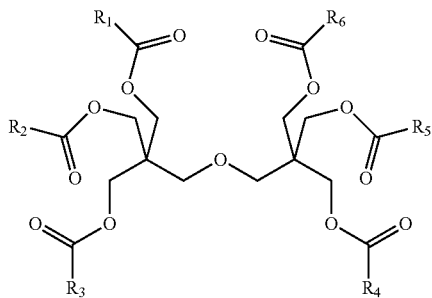
(1)

wherein $R_1$ to $R_6$ are the same or different and independently an alkyl group having 10 to 32 carbon atoms.

2. The resin composition according to claim 1, wherein the component (B) has a particle diameter of 1 to 800 nm.

3. The resin composition according to claim 1, which contains, relative to 100 parts by weight of the component (A), (E) 0.0002 to 0.8 part by weight of a heat stabilizer (component E).

4. The resin composition according to claim 3, wherein the component (E) is at least one heat stabilizer selected from the group consisting of a phenolic stabilizer (component E-1), a sulfur stabilizer (component E-2), and a phosphorus stabilizer (component E-3).

5. The resin composition according to claim 1, which contains, relative to 100 parts by weight of the component (A), (F) 0.1 to 2 parts by weight of an ultraviolet light absorber (component F).

6. The resin composition according to claim 5, wherein the component (F) is at least one ultraviolet light absorber selected from the group consisting of a benzotriazole ultraviolet light absorber (component F-1), a triazine ultraviolet light absorber (component F-2), and an oxazine ultraviolet light absorber (component F-3).

7. A film, sheet, or injection molded article, which comprises the resin composition according to claim 1.

8. The molded article according to claim 7, which has a thickness of 0.1 to 20 mm.

9. The molded article according to claim 7, which has a total light transmittance of 20% or more, as measured in accordance with ISO 9050, and has a haze of 5% or less, as measured in accordance with ISO 9050.

10. The molded article according to claim 7, which has been subjected to hard coat treatment with respect to one surface or both surfaces of the molded article.

11. The molded article according to claim 7, which is a lighting member for a vehicle, a sensor cover for a vehicle, a display device cover for a vehicle, a window member for a vehicle, a display device cover for a relay, or a window member for a building material.

* * * * *